United States Patent
Guo et al.

(10) Patent No.: US 7,800,853 B1
(45) Date of Patent: Sep. 21, 2010

(54) CORRECTING SERVO SECTORS IN A DISK DRIVE

(75) Inventors: Guoxiao Guo, Foothill Ranch, CA (US); Jie Yu, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 12/327,560

(22) Filed: Dec. 3, 2008

(51) Int. Cl.
*G11B 5/09* (2006.01)
*G11B 5/596* (2006.01)

(52) U.S. Cl. .................. 360/49; 360/77.08

(58) Field of Classification Search .......... None
See application file for complete search history.

(56) References Cited

U.S. PATENT DOCUMENTS

| | | | |
|---|---|---|---|
| 4,949,200 A | 8/1990 | Weng | |
| 5,459,623 A | 10/1995 | Blagaila et al. | |
| 5,757,567 A | 5/1998 | Hetzler et al. | |
| 5,784,219 A | 7/1998 | Genheimer | |
| 5,852,522 A | 12/1998 | Lee | |
| 5,909,334 A * | 6/1999 | Barr et al. | 360/53 |
| 5,917,439 A | 6/1999 | Cowen | |
| 5,982,308 A | 11/1999 | Bang | |
| 6,005,727 A | 12/1999 | Behrens et al. | |
| 6,038,091 A | 3/2000 | Reed et al. | |
| 6,043,946 A | 3/2000 | Genheimer et al. | |
| 6,075,667 A | 6/2000 | Kisaka et al. | |
| 6,115,198 A | 9/2000 | Reed et al. | |
| 6,118,603 A | 9/2000 | Wilson et al. | |
| 6,201,652 B1 | 3/2001 | Rezzi et al. | |
| 6,226,138 B1 | 5/2001 | Blaum et al. | |
| 6,233,715 B1 | 5/2001 | Kuki et al. | |
| 6,313,963 B1 | 11/2001 | Hsieh | |
| 6,345,021 B1 * | 2/2002 | Belser et al. | 369/47.1 |
| 6,405,342 B1 | 6/2002 | Lee | |
| 6,434,719 B1 | 8/2002 | Livingston | |
| 6,738,205 B1 | 5/2004 | Moran et al. | |
| 6,856,480 B2 | 2/2005 | Kuki et al. | |
| 6,876,316 B1 | 4/2005 | Wu | |
| 7,047,477 B2 | 5/2006 | Tolhuizen et al. | |
| 7,099,095 B1 | 8/2006 | Subrahmanyam et al. | |
| 7,206,157 B2 | 4/2007 | Ehrlich | |
| 7,369,343 B1 | 5/2008 | Yeo et al. | |

OTHER PUBLICATIONS

Hagenauer et al., "A Viterbi Algorithm with Soft-Decision Outputs and its Applications," in Proc. IEEE Global Telecommunications Conference 1989, Dallas, Texas, Nov. 1989, pp. 1680-1686.

* cited by examiner

Primary Examiner—K. Wong

(57) ABSTRACT

A disk drive is disclosed comprising a disk having a plurality of data tracks defined by a plurality of servo sectors, wherein each servo sector comprises a Gray coded address representing at least part of a track address. The disk drive further comprises a head actuated over the disk for detecting a first Gray coded address in a first servo sector. A second Gray coded address is generated in response to the first Gray coded address. The first Gray coded address is decoded into a first binary address, and the second Gray coded address is decoded into a second binary address. One of the first and second binary addresses closest to a target address is selected, and the head is positioned in response to the selected binary address.

24 Claims, 11 Drawing Sheets

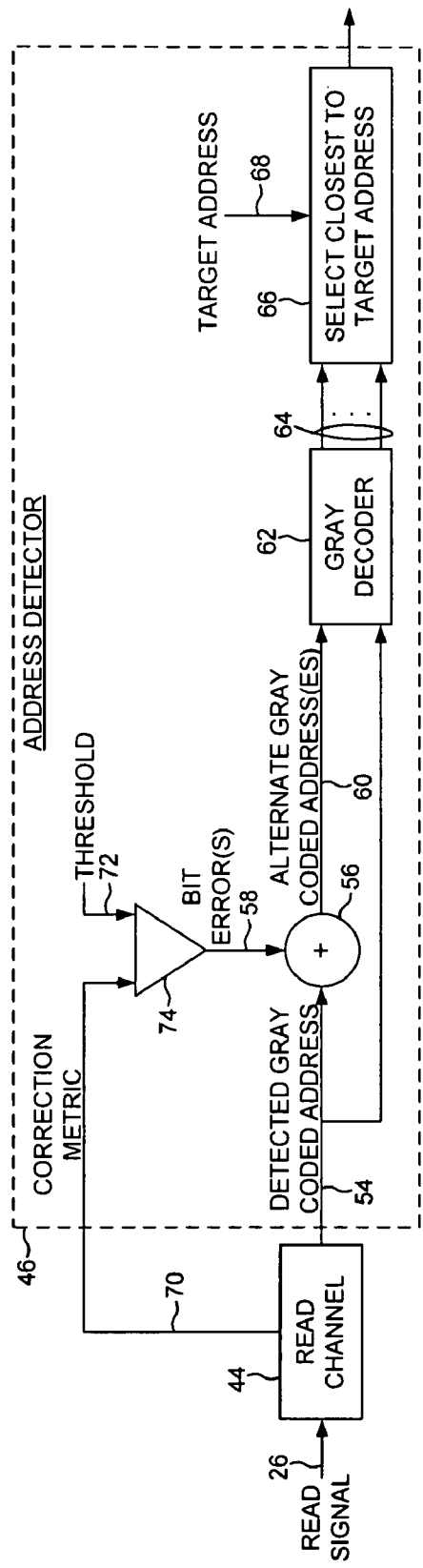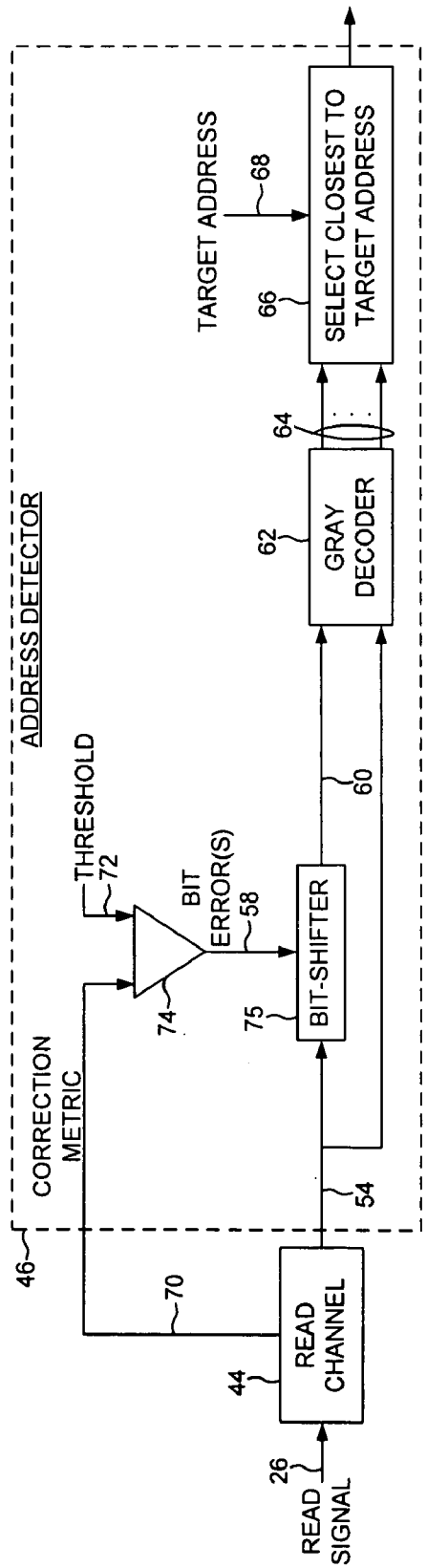

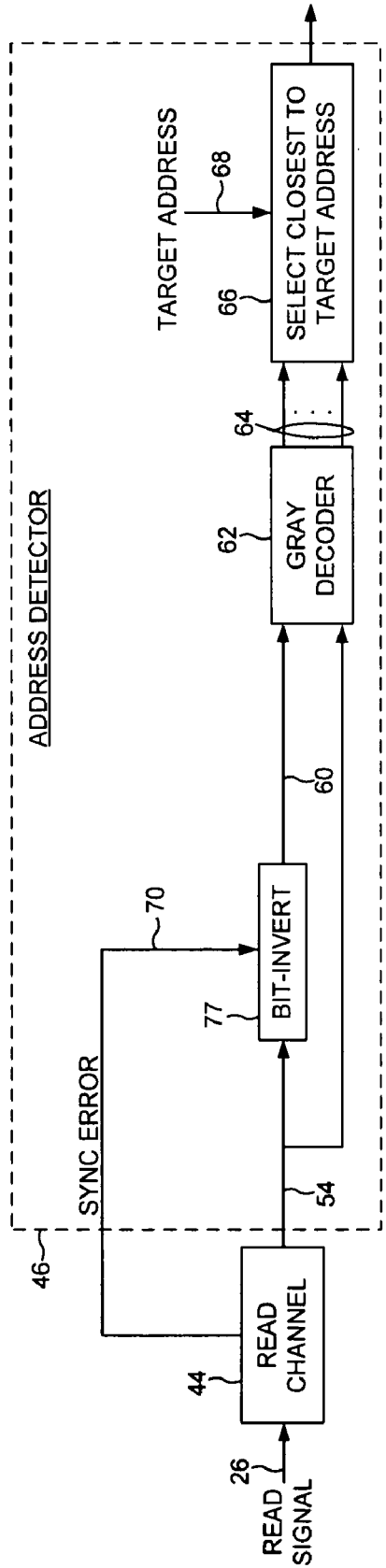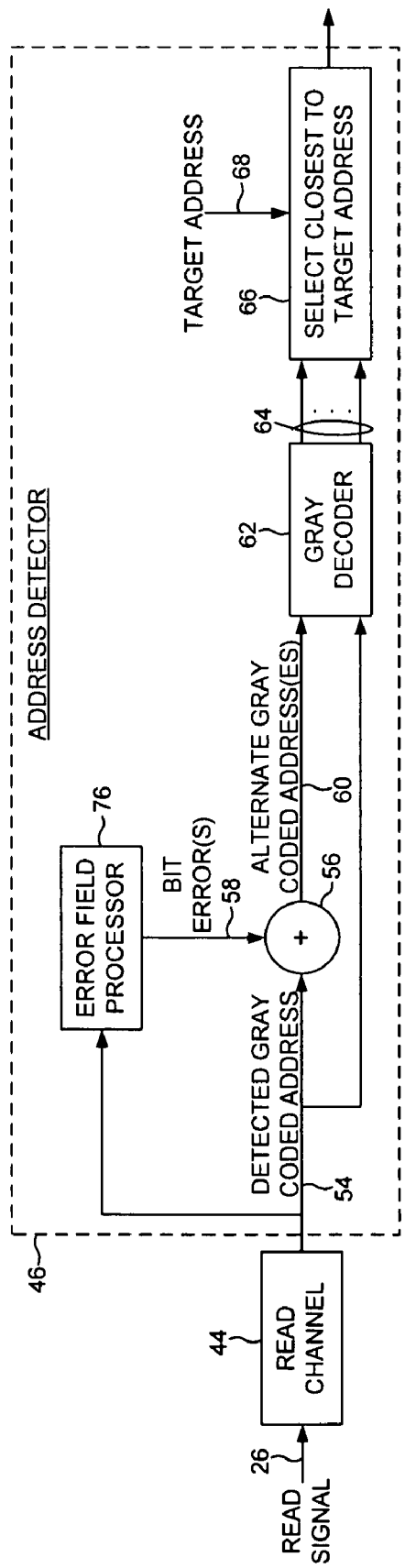

CORRECTING SERVO SECTORS IN A DISK DRIVE

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art format of a disk 2 comprising a plurality of concentric tracks 4 having embedded servo sectors $6_0$-$6_N$. Each servo sector (e.g., servo sector $6_4$) comprises a preamble 8 for synchronizing gain control and timing recovery, a sync mark 10 for synchronizing to a data field 12 comprising the coarse head positioning information (such as a Gray coded track address), and servo bursts 14 which provide fine head positioning information.

As the head passes over a servo sector, the head positioning information is processed to estimate the radial location of the head. The servo controller may comprise a state estimator which processes the detected head position to estimate various states of the head, such as its position, velocity, and acceleration. The estimated states may be compared to target values in a seek profile, wherein the error between the estimated states and target states is processed to generate a control signal applied to the VCM in order to move the head in a direction and velocity that reduces the error.

If the disk surface comprises defective servo sectors (which may be detected during a manufacturing procedure), the associated wedges of user data may be relocated to spare data sectors, or the entire data track may be relocated to a spare data track. However, relocating data wedges and/or data tracks is undesirable since it reduces the overall capacity of the disk and may also impact performance when seeking to the spare data wedges or spare data tracks. The state estimator in the servo controller will typically filter out miss-detected servo sectors during seek operations; however, if multiple sequential servo sectors are miss-detected during a seek, it may degrade performance by increasing the settle time. In addition, if the servo controller encounters a miss-detected servo sector while tracking the centerline of a data track during an access operation, the operation may be aborted and retried (particularly during write operations) which impacts performance due to the slipped revolutions.

BRIEF DESCRIPTION OF THE DRAWINGS

FIG. 4A shows an address detector according to an embodiment wherein bit errors are generated in response to a correction metric representing a probability that a bit in the first Gray coded address was miss-detected.

FIG. 4B shows an address detector according to an embodiment of the present invention wherein the second Gray coded address is generated by shifting the first Gray coded address left or right at least one bit when a correction metric exceeds a threshold.

FIG. 4C shows an address detector according to an embodiment of the present invention wherein the second Gray coded address is generated by inverting all the bits in the detected first Gray coded address.

FIG. 4D shows an address detector according to an embodiment wherein the bit errors are read from an error field recorded on the disk.

DETAILED DESCRIPTION OF EMBODIMENTS OF THE INVENTION

Figures 2A, 2B:
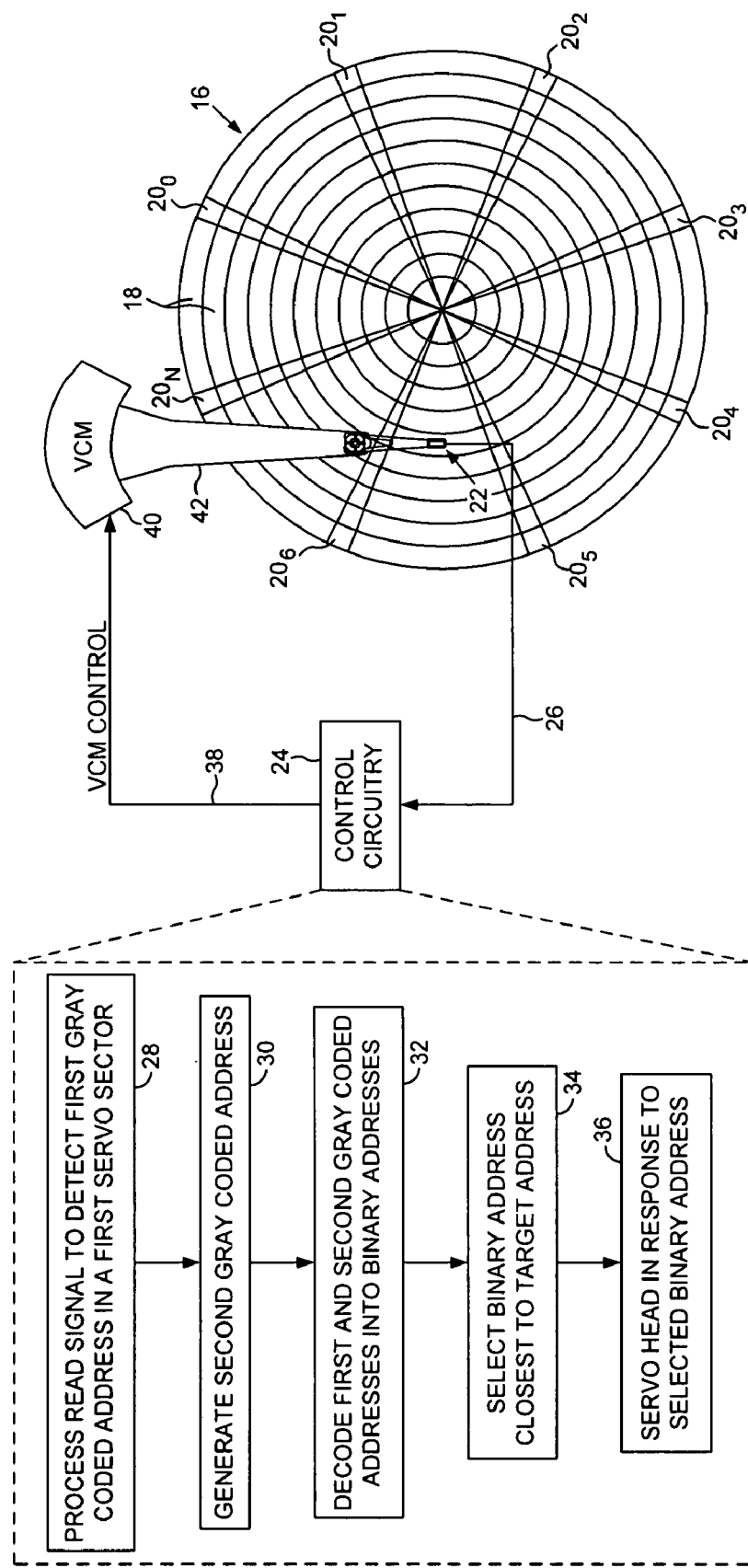
FIG. 2A shows a disk drive according to an embodiment of the present invention comprising a disk, a head actuated over the disk, and control circuitry.
FIG. 2B is a flow diagram according to an embodiment of the present invention wherein a second Gray coded address is generated in response to a detected first Gray coded address, both are decoded into binary addresses, and the binary address closest to a target address is selected to servo the head.

FIG. 2A shows a disk drive according to an embodiment of the present invention comprising a disk 16 having a plurality of data tracks 18 defined by a plurality of servo sectors $20_0$-$20_N$, wherein each servo sector comprises a Gray coded address representing at least part of a track address. The disk drive further comprises a head 22 actuated over the disk 16, and control circuitry 24 for executing the flow diagram of FIG. 2B. The read signal 26 is processed to detect a first Gray coded address in a first servo sector (step 28). A second Gray coded address is generated in response to the first Gray coded address (step 30). The first Gray coded address is decoded into a first binary address, and the second Gray coded address is decoded into a second binary address (step 32). One of the first and second binary addresses closest to a target address is selected (step 34), and the head is positioned in response to the selected binary address (step 36).

In the embodiment of FIG. 2A, the control circuitry 24 processes the read signal 26 emanating from the head 22 to demodulate the servo sectors $20_0$-$20_N$ into a position error signal (PES). The PES is filtered with a suitable compensation filter to generate a control signal 38 applied to a voice coil motor (VCM) 40 which rotates an actuator arm 42 about a pivot in order to position the head 22 radially over the disk 16 in a direction that reduces the PES. The servo sectors $20_0$-$20_N$ may comprise any suitable position information, such as a Gray coded address for coarse positioning and servo bursts for fine positioning.

Figure 3A:
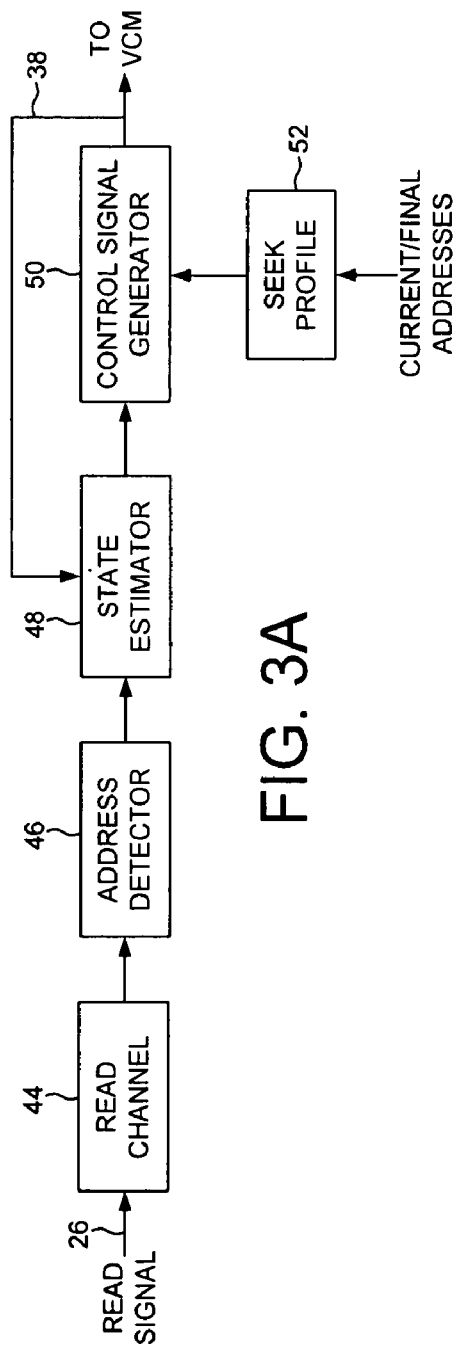
FIG. 3A shows control circuitry according to an embodiment of the present invention comprising a read channel and an address detector.

FIG. 3A shows control circuitry according to an embodiment of the present invention comprising a read channel 44 for detecting the first Gray coded address in a servo sector from the read signal 26. An address detector 46 generates a binary address representing a radial location of the head. A state estimator 48 processes the binary address to effectively filter out outlier binary addresses output by the address detector 46. A control signal generator 50 processes the binary address output by the state estimator 48, for example, by comparing the binary address to a target address generated in response to a seek profile 52 to generate a PES. The PES is filtered with a suitable compensation filter to generate the VCM control signal 38.

Figure 3B:
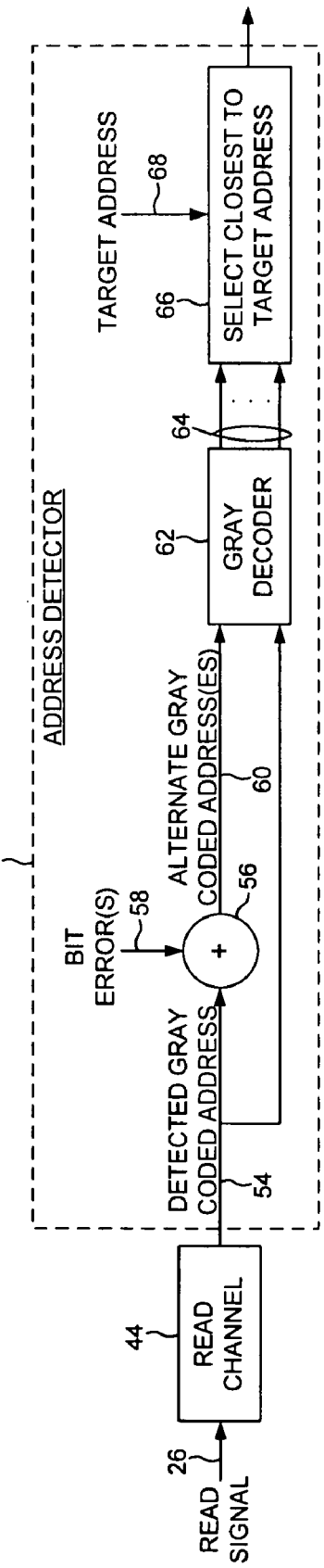
FIG. 3B shows an address detector according to an embodiment of the present invention wherein the second Gray coded address is generated in response to bit errors in the first Gray coded address.

FIG. 3B shows an embodiment of an address detector 46 wherein the detected Gray coded address 54 is XORed 56 with one or more detected bit errors 58 to generate an alternate Gray coded address 60 by inverting one or more bits in the detected Gray coded address 54. In one embodiment, multiple alternate Gray coded addresses are generated by XORing 56 the detected Gray coded address 54 with different bit error sequences 58. For example, if an error is detected in the last two bits of the detected Gray coded address 54, a first alternate Gray coded address may be generated by XORing the bit sequence "01" with the detected Gray coded address 54, a second alternate Gray coded address may be generated by XORing the bit sequence "10" with the detected Gray coded address 54, and a third alternate Gray coded address may be generated by XORing the bit sequence "11" with the detected Gray coded address 54. The detected Gray coded address 54 and the alternate Gray coded address(es) are decoded by a Gray decoder 62 into corresponding binary addresses 64. A comparator 66 compares the binary addresses 64 to a target address 68 in order select the binary address 64 closest to the target address 68 as the output of the address detector 46.

FIG. 4A shows an embodiment of an address detector 46 wherein the inverted bits (bit errors 58) are identified in response to a correction metric 70 generated in response to the read signal 26 when detecting the detected Gray coded address 54. Any suitable correction metric 70 may be employed, such as a sequence detector margin (e.g., a Viterbi margin), gain control error, timing error, or other metric that represents a probability that a corresponding bit may have been miss-detected. A bit error 58 is generated in the embodiment of FIG. 4A when the correction metric 70 exceeds a threshold 72 at comparator 74.

FIG. 4B shows an embodiment of an address detector 46 wherein when a correction metric 70 exceeds a threshold 72 indicating a probable detection error (e.g., a timing error or synchronization error), the alternate Gray coded address 60 is generated by shifting 75 the detected Gray coded address 54 left or right by one or more bits. In one embodiment, multiple alternate Gray coded addresses 60 are generated by shifting the detected Gray coded address 54 left and right one or more bits. Alternatively, multiple alternate Gray coded addresses 60 may be generated by shifting the detected Gray coded address 54 left or right by a first number of bits and by a second number of bits (e.g., shifting by one bit and by two bits). In one embodiment, multiple alternate Gray coded addresses 60 are also generated for each possible bit pattern shifted into the alternate Gray coded address 60. For example, if the detected Gray coded address 54 is shifted by one bit, a first alternate Gray coded address 60 is generated by shifting a "0" bit into the resulting Gray coded address, and a second alternate Gray coded address 60 is generated by shifting a "1" bit into the resulting Gray coded address.

In one embodiment, a channel code may be employed to encode the Gray coded address recorded on the disk. For example, a Manchester code may be employed wherein each "1" bit of the Gray code may be recorded as "1100" and each "0" bit may be recorded as "0011". This channel code limits the number of consecutive "0" bits (non-transitions) similar to a run length limited (RLL) code in order to improve timing recovery. However, a synchronization error can result in the Gray coded address being detected with all of the bits inverted. In an embodiment shown in FIG. 4C, if a synchronization error 70 is detected (e.g., by detecting a phase error or invalid channel coded bits), the alternate Gray coded address 60 may be generated by inverting all of the bits 77 in the detected Gray coded address 54.

FIG. 4D shows an embodiment of an address detector 46 wherein the inverted bits (bit errors 58) are identified by a pointer recorded on the disk in an error field. An error field processor 76 evaluates the error field to determine the location of the bit errors 58 in the detected Gray coded address 54. The error field may identify the bit errors 58 in any suitable manner. In one embodiment, the error field comprises one or more bits for identifying a particular byte, and one or more bits for identifying the bit errors 58 within the byte. In one embodiment, the error field comprises 8 bits for identifying the bit errors 58 within a byte, wherein each "1" bit in the 8 bits identifies a bit error 58. In one embodiment, the error field identifies bit errors 58 in the lower bytes (or just the least significant byte) of the detected Gray coded address 54.

In one embodiment, multiple alternate Gray coded addresses 60 may be generated using two or more of the techniques described above with reference to FIGS. 4A-4D. In addition, one or more of the alternate Gray coded addresses 60 may be generated using any suitable combination of techniques, for example, by shifting 75 the detected Gray coded address 54 as well as correcting (inverting) one or more bits in response to detected bit errors 58. All of the alternate Gray coded addresses 60 (as well as the detected Gray coded address 54) are then decoded 62 into corresponding binary addresses 64, and the binary address closest to the target address 68 is selected 66 to servo the head.

Figure 5A:
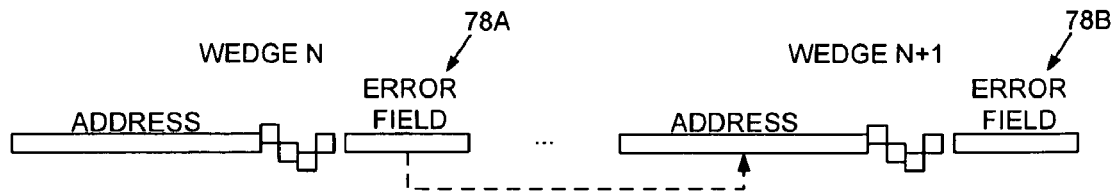
FIG. 5A shows an embodiment of the present invention wherein the error field for a current servo sector is recorded after the previous servo sector.

FIG. 5A shows an embodiment of the present invention wherein an error field is recorded after each servo sector, such as error fields 78A and 78B. As illustrated in FIG. 5A, each error field is used to correct the detected Gray coded address in the following servo sector. In one embodiment, the error fields are recorded after each servo sector at the user data rate of a data sector. In this embodiment, each error field may comprise a suitable preamble and sync mark for synchronizing to the data in the error field.

Figure 5B:
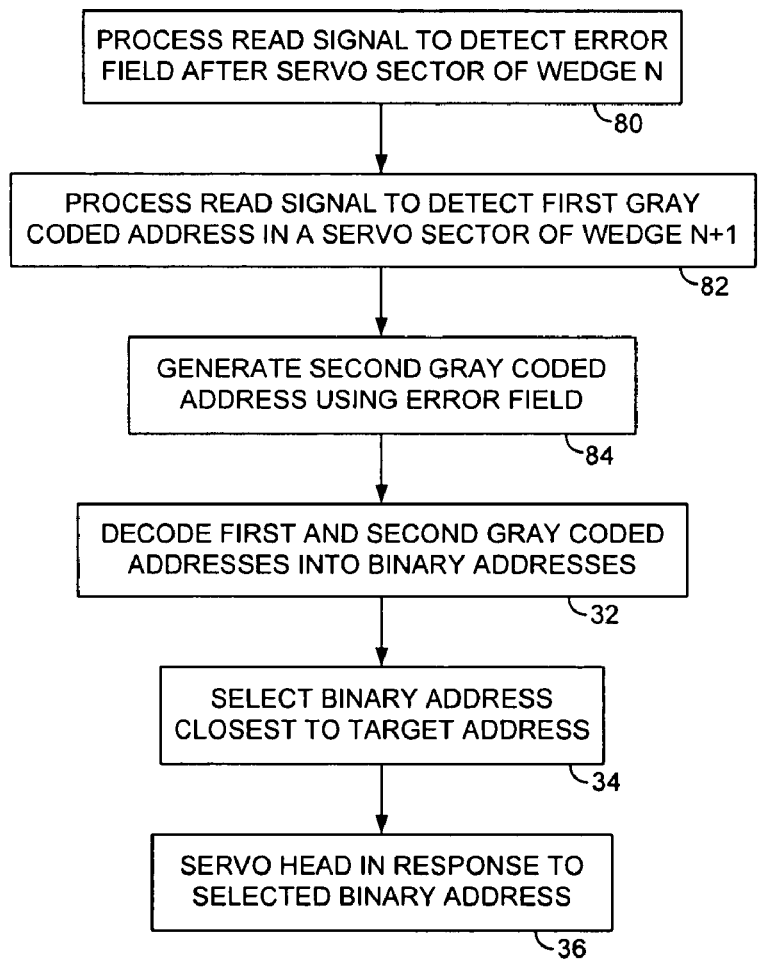
FIG. 5B is a flow diagram according to an embodiment of the present invention wherein the second Gray coded address is generated in response to the error field.

FIG. 5B is a flow diagram according to an embodiment of the present invention wherein the read signal 26 is processed to detect the error field 78A recorded after a servo sector of wedge N (step 80). When the head reaches the servo sector of wedge N+1, the Gray coded address is detected (step 82) and the alternate Gray code address(es) are generated in response to the error field 78A (step 84). The remaining steps of FIG. 5B are described above with reference to FIG. 2B.

Figure 6A:
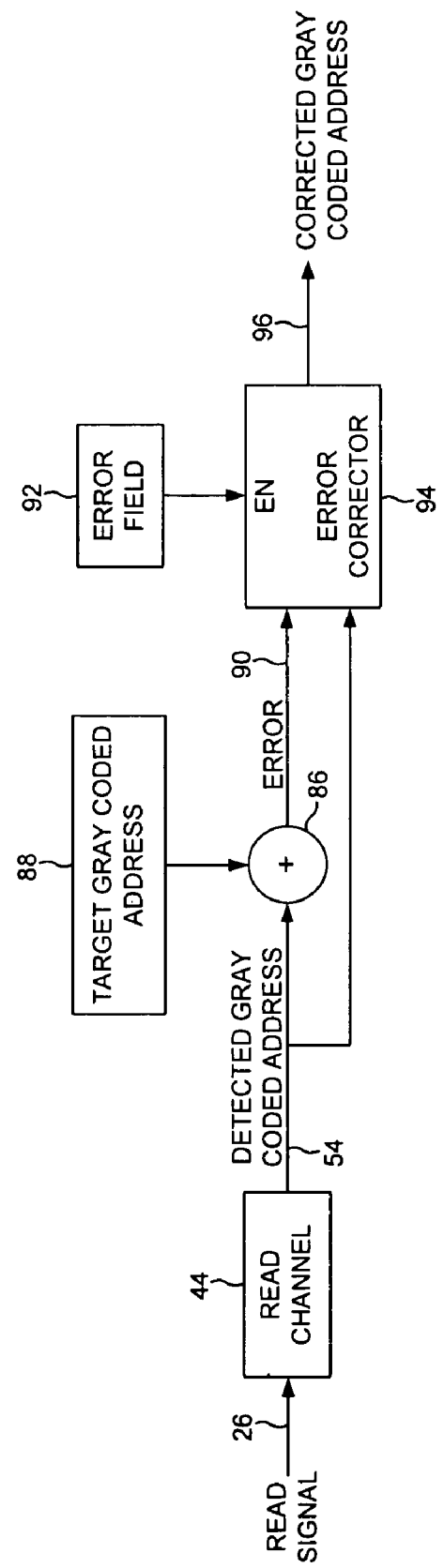
FIG. 6A shows control circuitry according to an embodiment wherein the detected Gray coded address is corrected using a target Gray coded address when the error field indicates an error is present.

FIG. 6A shows control circuitry according to an embodiment of the present invention wherein the detected Gray coded address 54 is compared (XORed 86) with a target Gray coded address 88 to generate bit errors 90 in the detected Gray coded address 54. The target Gray coded address 88 may be generated by Gray encoding the target binary address of the seek profile 52 in FIG. 3A. The control circuitry reads an error field 92 recorded on the disk, and an error corrector 94 corrects the detected Gray coded address 54 using the bit errors 90 when the error field 92 indicates the need to correct the detected Gray coded address 54. In one embodiment, the error corrector 94 generates a corrected Gray coded address 96 by XORing the detected Gray coded address 54 with the bit errors 90.

Figure 6B:
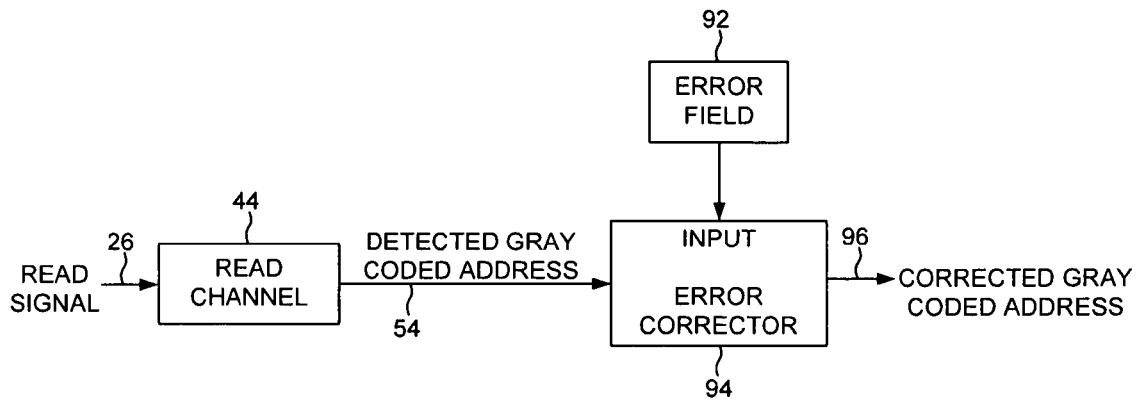
FIG. 6B shows control circuitry according to an embodiment wherein the error field stores correction information for correcting the detected Gray coded address.
Figure 6C:
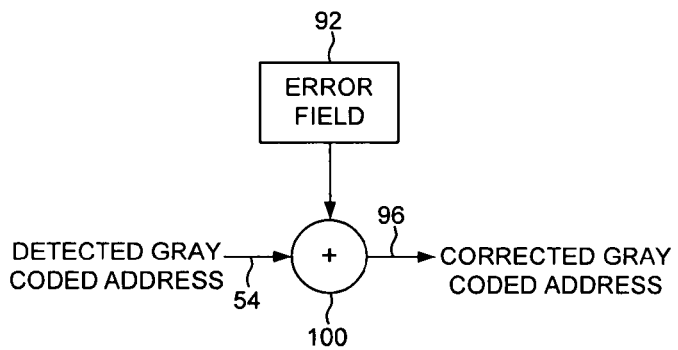
FIG. 6C shows control circuitry according to an embodiment wherein the correction information stored in the error field is XORed with the detected Gray coded address in order to correct the detected Gray coded address.
Figure 6D:
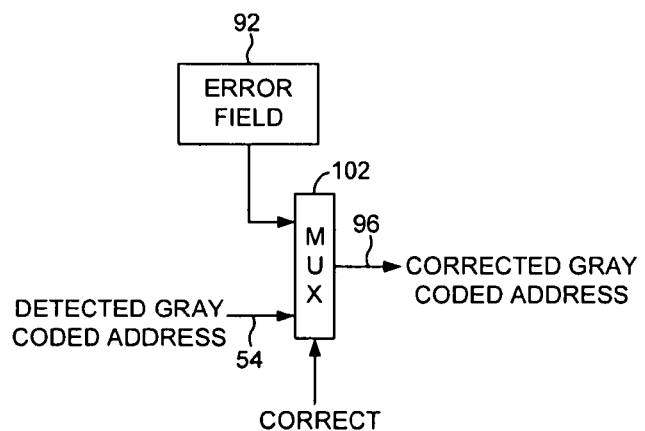
FIG. 6D shows control circuitry according to an embodiment wherein the correction information stored in the error field replaces part of the detected Gray coded address in order to correct the detected Gray coded address.

In the embodiment of FIG. 6A, the error field 92 may comprise a single bit (a flag) that indicates whether the detected Gray coded address 54 is likely in error. In an alternative embodiment shown in FIG. 6B, the error field 92 comprises a multiple bit correction value for correcting the detected Gray coded address 54. An error corrector 94 corrects the detected Gray coded address 54 using the data stored in the error field 92. In an embodiment shown in FIG. 6C, the error corrector 94 generates a corrected Gray coded address 96 by XORing 100 the detected Gray coded address 54 with bit errors stored in the error field 92. In an alternative embodiment shown in FIG. 6D, the error field 92 stores the corrected portion of the detected Gray coded address 54 (e.g., a byte), and the error corrector 94 generates a corrected Gray coded address 96 by replacing one or more bits of the detected Gray coded address 54 with data stored in the error field 92. In the embodiment of FIG. 6D, the correction is implemented using a multiplexer 102, but any suitable technique may be employed.

Figure 7:
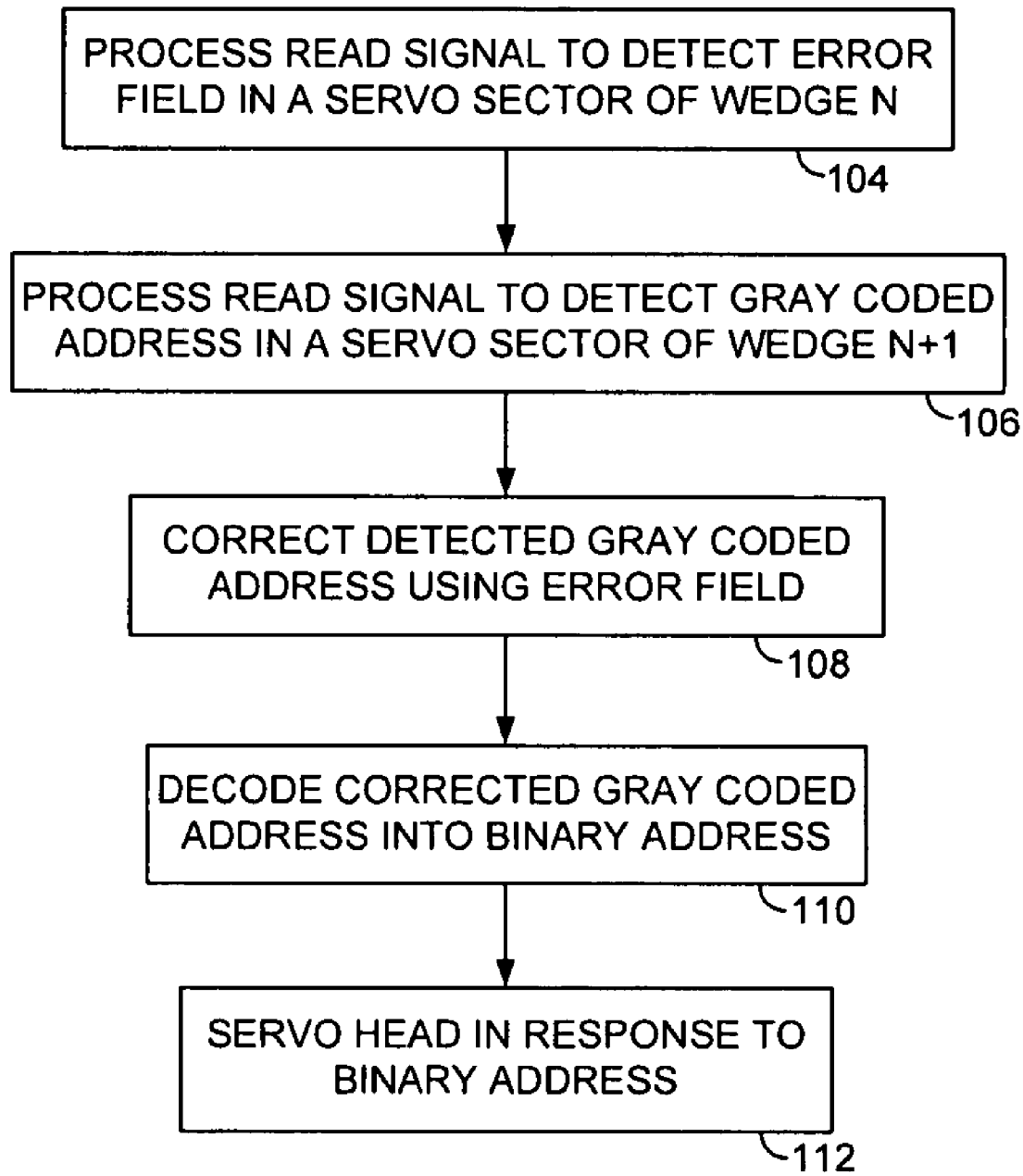
FIG. 7 is a flow diagram according to an embodiment of the present invention wherein an error field is used to correct the detected Gray coded address.

FIG. 7 is a flow diagram according to an embodiment of the present invention wherein the read signal 26 is processed to detect the error field recorded after a servo sector of wedge N (step 104). When the head reaches the servo sector of wedge N+1, the Gray coded address is detected (step 106) and corrected in response to the error field (step 108). The corrected Gray coded address is decoded into a binary address (step 110) which used to servo the head (step 112).

The data stored in the error field 78A and 78B of FIG. 5A, and the error field 92 of FIGS. 6A-6D, may be generated in any suitable manner. In one embodiment, the servo sectors are evaluated during a manufacturing procedure for each disk drive. Each servo sector may be read (multiple times in one embodiment) and the read signal evaluated to detect marginal bits in the Gray coded address. The marginal bits may be detected in any suitable manner, such as by detecting a read signal amplitude or timing degradation, or by evaluating an error metric, such as a squared error or Viterbi margin. After detecting the marginal bits, any suitable data may be written to the corresponding error field, ranging from a single flag bit to multiple bits used to correct or replace bits in the detected Gray coded address as described above.

Figure 1:
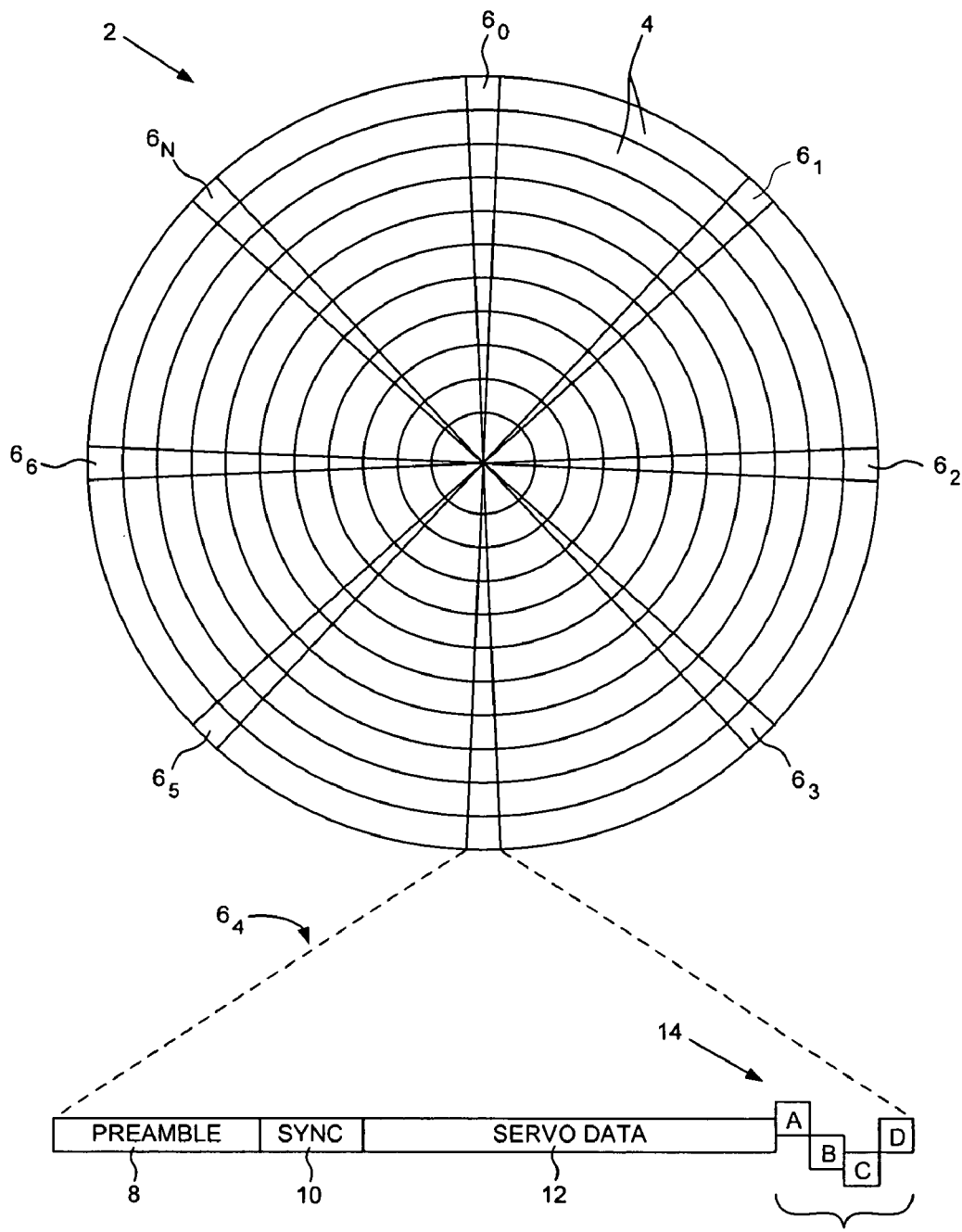
FIG. 1 shows a prior art disk format comprising a plurality of tracks defined by embedded servo sectors.
Figure 8A:
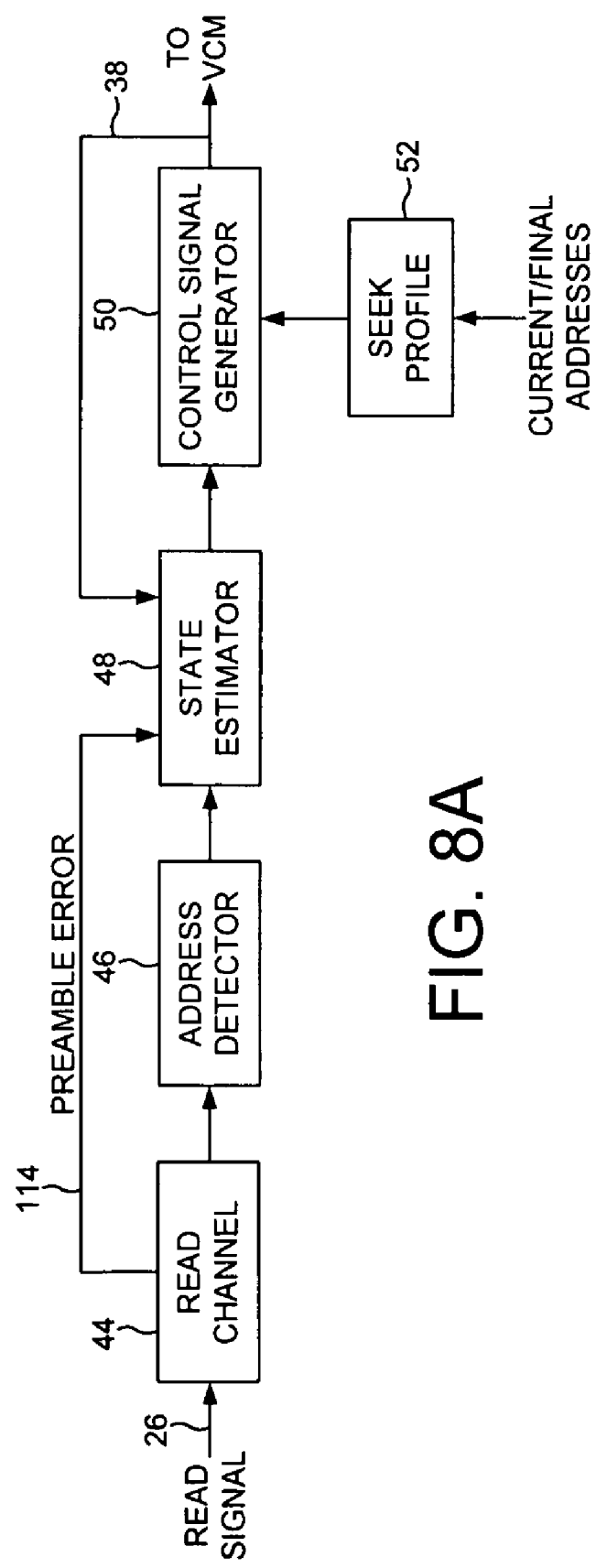
FIG. 8A shows control circuitry according to an embodiment wherein if the read channel detects an error in the preamble of a servo sector, a state estimator estimates the binary address for servoing the head.

FIG. 8A shows control circuitry according to an embodiment of the present invention wherein the read channel 44 synchronizes to a preamble field 8 (FIG. 1) in each servo sector. If the read channel 44 detects an error in the preamble 8 due, for example, to a media defect, the read channel 44 configures the state estimator 48 over line 114 to ignore the detected Gray coded address and instead generate an estimated binary address for use in servoing the head. In one embodiment, the error in the preamble may be detected due to an inability to detect the sync mark 10 (FIG. 1) in the servo sector. Even if the sync mark 10 can be detected, in one embodiment the read channel 44 may detect an error in the preamble 8 if the quality of the read signal 26 is too low as determined, for example, from the amplitude of the read signal 26 or excessive timing errors when synchronizing to the preamble 8.

Figure 8B:
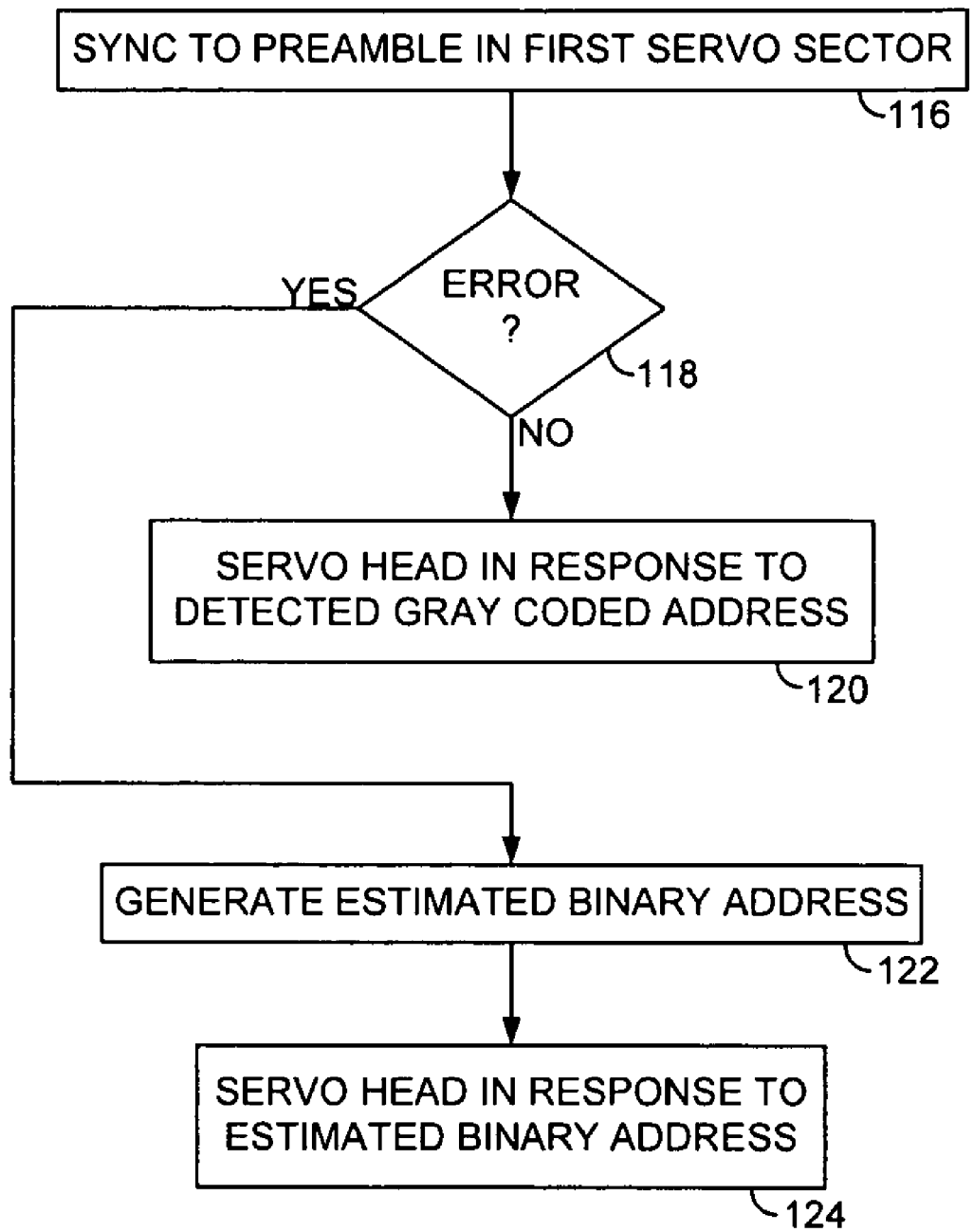
FIG. 8B is a flow diagram according to an embodiment of the present invention wherein the binary address for servoing the head is estimated if an error is detected in the preamble of the servo sector.

FIG. 8B shows a flow diagram according to an embodiment of the present invention wherein the read channel synchronizes to a preamble in a servo sector (step 116). If an error is not detected in the preamble (step 118), the control circuitry servos the head in response to a binary address generated in response to the Gray coded address detected in the servo sector (step 120). If an error is detected in the preamble (step 118), an estimated binary address is generated (step 122) and used to servo the head (step 124).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of data tracks defined by a plurality of servo sectors, wherein each servo sector comprises a Gray coded address representing at least part of a track address;
    a head actuated over the disk; and
    control circuitry operable to:
        detect a first Gray coded address in a first servo sector;
        generate a second Gray coded address in response to the first Gray coded address;
        decode the first Gray coded address into a first binary address;
        decode the second Gray coded address into a second binary address;

select one of the first and second binary addresses closest to a target address; and position the head in response to the selected binary address.

2. The disk drive as recited in claim 1, wherein the control circuitry is further operable to generate the second Gray coded address by inverting at least one bit of the first Gray coded address.

3. The disk drive as recited in claim 2, wherein the inverted bit is identified in response to a correction metric generated in response to the read signal when detecting the first Gray coded address.

4. The disk drive as recited in claim 3, wherein the correction metric represents a probability that the inverted bit in the first Gray coded address was miss-detected.

5. The disk drive as recited in claim 1, wherein the control circuitry is further operable to generate the second Gray coded address by shifting the first Gray coded address by at least one bit.

6. The disk drive as recited in claim 2, wherein the inverted bit is identified by a pointer recorded on the disk in an error field.

7. The disk drive as recited in claim 6, wherein the head reads the error field prior to reading the first servo sector.

8. The disk drive as recited in claim 6, wherein the pointer is recorded in the error field at a user data rate.

9. The disk drive as recited in claim 1, wherein the control circuitry is further operable to:
synchronize to a preamble field in the first servo sector;
detect an error in the preamble; and
when the error is detected:
generate an estimated binary address; and
position the head in response to the estimated binary address.

10. A disk drive comprising:
a disk comprising a plurality of data tracks defined by a plurality of servo sectors, wherein each servo sector comprises a Gray coded address representing at least part of a track address;
a head actuated over the disk; and
control circuitry operable to:
detect a first Gray coded address in a first servo sector;
read an error field recorded on the disk;
correct the first Gray coded address in response to the error field; and
position the head in response to the corrected Gray coded address.

11. The disk drive as recited in claim 10, wherein the head reads the error field prior to reading the first servo sector.

12. The disk drive as recited in claim 10, wherein the error field is recorded at a user data rate.

13. The disk drive as recited in claim 10, wherein the control circuitry is further operable to:
decode the first Gray coded address into a first binary address;
decode the corrected Gray coded address into a second binary address;
select one of the first and second binary addresses closest to a target address; and
position the head in response to the selected binary address.

14. The disk drive as recited in claim 10, wherein:
the first Gray coded address comprises a plurality of bytes including a most significant byte and a least significant byte; and
the error field comprises a pointer that points to at least one bit error in the least significant byte of the first Gray coded address.

15. The disk drive as recited in claim 10, wherein the control circuitry is further operable to generate data stored in the error field by:
reading the first Gray coded track address;
generating a correction metric for the first Gray coded address; and
comparing the correction metric to a threshold.

16. A method of operating a disk drive, the disk drive comprising a disk comprising a plurality of data tracks defined by a plurality of servo sectors, wherein each servo sector comprises a Gray coded address representing at least part of a track address, and a head actuated over the disk, the method comprising:
detecting a first Gray coded address in a first servo sector;
generating a second Gray coded address in response to the first Gray coded address;
decoding the first Gray coded address into a first binary address;
decoding the second Gray coded address into a second binary address;
selecting one of the first and second binary addresses closest to a target address; and
positioning the head in response to the selected binary address.

17. The method as recited in claim 16, further comprising generating the second Gray coded address by inverting at least one bit of the first Gray coded address.

18. The method as recited in claim 17, further comprising identifying the inverted bit in response to a correction metric generated in response to the read signal when detecting the first Gray coded address.

19. The method as recited in claim 18, wherein the correction metric represents a probability that the inverted bit in the first Gray coded address was miss-detected.

20. The method as recited in claim 16, further comprising generating the second Gray coded address by shifting the first Gray coded address by at least one bit.

21. The method as recited in claim 17, wherein the inverted bit is identified by a pointer recorded on the disk in an error field.

22. The method as recited in claim 21, further comprising reading the error field prior to reading the first servo sector.

23. The method as recited in claim 21, wherein the pointer is recorded in the error field at a user data rate.

24. The method as recited in claim 16, further comprising:
synchronizing to a preamble field in the first servo sector;
detecting an error in the preamble; and
when the error is detected:
generating an estimated binary address; and
positioning the head in response to the estimated binary address.

* * * * *